Aug. 7, 1923.

J. OLSON 1,463,907

FLOAT CONTROLLED VALVE

Filed April 14, 1921

INVENTOR.
John Olson,
BY
ATTORNEYS

Patented Aug. 7, 1923.

1,463,907

UNITED STATES PATENT OFFICE.

JOHN OLSON, OF DETROIT, MICHIGAN.

FLOAT-CONTROLLED VALVE.

Application filed April 14, 1921. Serial No. 461,301.

*To all whom it may concern:*

Be it known that I, JOHN OLSON, a citizen of the United States of America, residing at Detroit, in the county of Wayne and State of Michigan, have invented certain new and useful Improvements in Float-Controlled Valves, of which the following is a specification, reference being had therein to the accompanying drawings.

This invention relates to a valve particularly adapted for use in the water container used in hot air furnaces for humidifying the air.

It has for its object to simplify the construction of such valves, to provide convenient means by which the valve passages may be cleaned if obstructed in any manner and otherwise to improve valves of this class as will appear hereinafter in the description.

Figure 1:
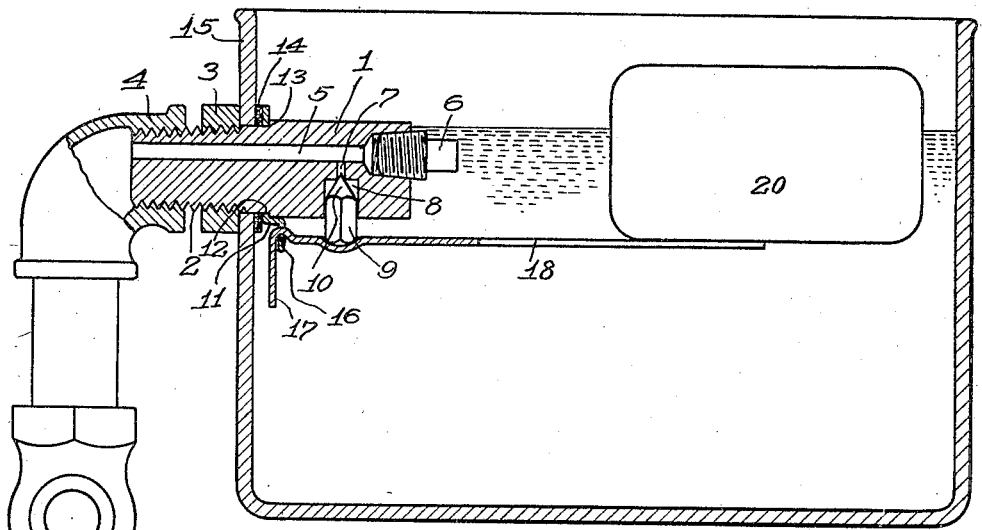
Figure 1 represents a central longitudinal section of my improved valve applied to a tank or receptacle.
Figure 2:
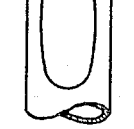
Fig. 2 is a perspective view of the hinge member for supporting the float arm.
Figure 3:
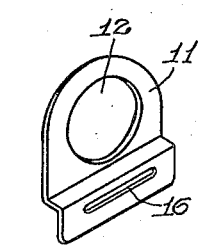
Fig. 3 is a fragmentary perspective view of the end portion of the float arm.

The valve consists of a body member 1 preferably consisting of a solid piece of metal not affected by rust or heat, one end of the body being screw threaded as at 2, to receive a nut 3 and a connection 4, water entering through said connection from any suitable source of supply. The body 1 is provided with a longitudinal bore 5, the inner end of which is enlarged and internally threaded to receive a plug 6. A transverse bore is formed with a small inner portion 7 communicating with the bore 5 and a larger outer portion 8 within which is mounted a metal valve plunger 9 preferably formed as a square rod having a conical inner end 10 adapted to close the passage 7.

A hinge member or plate 11 consisting of a flat piece of metal has a perforation 12 to receive the body 1 of the valve. The hinge member 11 is seated against a shoulder 13 on the body 1 and a washer 14 is placed on the body against the hinge member 11. When the nut 3 is made tight, the washer 14 is compressed between the plate 11 and the end wall 15 of the tank, the valve thus being held firmly in place and the joint being made water tight.

The lower end of the member 11 has a flange offset inwardly from the wall 15 and downwardly from the body 1, a slot 16 being formed in the depending flange to receive the bent end 17 of the float arm 18. As shown in Fig. 1, the bent end 17 is of such a length as to engage the wall 15 before the arm 18 can swing to an angle such as to permit the end 17 to be withdrawn from the slot 16 or the plunger to slde out of the perforation 8. The float arm thus cannot become accidentally detached. The end 17 must be placed through the slot 16 before the plate 11 is set in position on the valve body 1. A recess 19 is formed in the upper surface of the arm 18 to receive the rounded lower end of the valve plunger 9. When water enters through the port 7 it flows out through the bore 8, the flat sides of the plunger 9 providing passages on all sides of the plunger.

When the float 20 has been pushed upward by the water flowing into the tank the arm 18 presses the plunger 9 upward, forcing the conical end 10 into the passage 7 to form a tight closure and prevent the entry of water until some of the water in the tank has evaporated from the surface.

From the above description it will be apparent that there is thus provided a device of the character described, possessing the particular features of advantage before enumerated as desirable, but which obviously is susceptible of modification in its form, proportion, details of construction and arrangement of parts without departure from the principle involved or sacrificing any of its advantages.

While in order to comply with the statute the invention has been described in a language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

I claim:—

1. A float valve comprising a body having a longitudinal perforation throughout its length, a removable means for closing the inner end of the perforation, a transverse bore through the side of the body communicating with the longitudinal bore, the inner portion of the transverse bore being smaller than the outer portion, a valve plunger longitudinally slidable within the outer portion of the transverse bore and having its inner end of a configuration to close the smaller portion of the bore, a float arm having a bent end, a hinge member comprising a plate having an opening therethrough, adapted to receive the body of the valve and having a second opening spaced from the first opening and adapted to receive the bent end of the float arm, the said float arm having a recess adapted to engage the outer end of the valve plunger and a float secured to the outer end of the float arm.

2. A combination with a tank having an opening in one wall thereof, of a valve having a body externally screw threaded from one end, a float arm having a bent end, a hinge member having a lower depending portion perforated to receive the bent end of the float arm, and positioned adjacent to the inner face of the tank wall, a nut engaging the screw threaded portion of the valve body and bearing against the outer face of the tank wall, the bent end of the float arm lying substantially parallel with the wall of the tank and being of a length greater than the distance from the wall of the tank to the depending perforated portion of the hinge member whereby to prevent removal of the float arm from the hinge member when the valve body is attached to the tank.

3. The combination with a tank having an opening in one wall thereof, of a valve, the body of which is reduced for a portion of its length to form a shoulder, a hinge member surrounding the body of the valve and engaging the shoulder, the outer end of the reduced portion being screw threaded to receive a nut and a pipe connection, the nut acting to clamp the hinge member between the wall of the tank and the shoulder, the body of the valve having a longitudinal perforation adapted to communicate with the pipe connection and closed at the end within the tank by a removable closure, a transverse bore in the lower side of the valve body having a reduced inner end, communicating with the longitudinal perforation, a valve plunger of non-circular cross section mounted to slide in the transverse bore and having its upper end adapted to close the reduced inner portion of the bore and a float arm engaging the hinge member at one end and having a float at the end remote from the hinge member, the float arm having a seat formed to engage the outer end of the valve plunger to hold it in operative position.

In testimony whereof I affix my signature in presence of two witnesses.

JOHN OLSON.

Witnesses:
GEORGE A. PAGE,
ARTHUR MINNICK,